United States Patent
Knopp

[11] 3,717,442
[45] Feb. 20, 1973

[54] BRAZING ALLOY COMPOSITION

[75] Inventor: Walter V. Knopp, Wyckoff, N.J.

[73] Assignee: A. Johnson & Co. Inc., New York, N.Y.

[22] Filed: May 17, 1971

[21] Appl. No.: 143,759

[52] U.S. Cl. ............29/182.2, 29/194, 29/196, 29/196.1, 29/504, 75/134 N, 75/208 R
[51] Int. Cl. ............................B22f 3/00, C22c 33/00
[58] Field of Search....75/208, 224, 134 N, 161, 153; 29/182.1, 182.2, 182.3, 504, 196, 194, 196.1

[56] References Cited

UNITED STATES PATENTS

| | | | |
|---|---|---|---|
| 2,743,177 | 4/1956 | Cape | 75/171 |
| 2,899,302 | 8/1959 | Cape | 75/170 |
| 3,198,609 | 8/1965 | Cape | 29/196 |
| 3,343,927 | 9/1967 | Derleth et al. | 29/182.3 X |
| 2,401,483 | 6/1946 | Hensel | 29/182.1 X |

OTHER PUBLICATIONS

American Welding Society Brazing Manual . N. Y. American Welding Society 1963 p. iv–v Primary Examiner—Leland A. Sebastian
Assistant Examiner—R. E. Schafer
Attorney—Sandoe, Hopgood and Calimafde

[57] ABSTRACT

A powder brazing composition is provided comprising a blend of at least two alloy powders (A) and (B) as essential ingredients, the ratio of powder alloy (A) to powder alloy (B) ranging in parts by weight from about 50(A)/50(B) to 75(A)/25(B); the composition of alloy (A) consisting essentially by weight of about 35 to 70 percent copper, about 3 to 20 percent nickel and the balance essentially manganese in the range of about 15 to 50 percent; the composition of alloy (B) consisting essentially of about 2.5 to 5.5 percent silicon, about 0.75 to 5.25 percent boron and the balance essentially nickel; the mixture being such that the average composition thereof with respect to the silicon and boron contents being about 0.05 to 3 percent silicon and about 0.15 to 1.5 percent boron by weight. A brazed joint will generally have substantially the average composition of the brazing alloy mixture.

18 Claims, 3 Drawing Figures

PATENTED FEB 20 1973

3,717,442

INVENTOR.
WALTER V. KNOPP

BY

Sandoe, Hopgood & Calimafde
ATTORNEYS

BRAZING ALLOY COMPOSITION

This invention relates to the brazing of one metal substrate to another and, in particular, relates to a brazing alloy composition comprising in its preferred aspects a uniform blend of at least two alloy brazing powders.

BACKGROUND OF THE INVENTION AND THE PROBLEM

In the brazing of metal parts together, e.g. steel parts, it is essential for effective results that the brazing metal or alloy flow smoothly at the brazing temperature and wet the metal surfaces to be brazed together so as to provide a smooth radial fillet of adequate strength at the joint, a brazing flux being generally used.

In the powder metallurgy art, it is not uncommon to braze and sinter compacted metal parts together in one operation, or braze a compacted metal part to a wrought metal part while simultaneously sintering the powder metal part.

However, a problem in brazing a pressed powder metal part to a metal substrate, be it a powder metal substrate or a wrought metal substrate, is that, because the pressed powder metal part is porous, precautions must be taken to avoid substantial infiltration of the bulk of the brazing alloy into the porous substrate, otherwise the joint is robbed of the benefits of the brazing material.

A still further problem is that in instances where substantial infiltration of the brazing alloy into the porous substrate results, erosion of the powder metal part is apt to occur so as to affect adversely the precision and appearance of the parts being brazed, as well as the physical properties thereof.

The foregoing is particularly a problem with respect to the combined sintering and brazing of pressed metal parts of steel, such as formulations of carbon steel.

Powder metal steel parts are generally produced by mixing carbon (e.g. 1 percent by weight of graphite) with iron powder and a lubricant (e.g. three-fourths percent by weight of zinc stearate) and the desired shape produced by pressing the powder in a mold at pressures of at least about 20 tsi (tons per square inch), for example from about 20 tsi to 60 tsi, or higher, to produce a green compact ranging in density of generally over 5.5 grams/c.c. to as high as 7 or higher. Generally, the green density may range from about 5.7 to 7 grams/c.c.

In order to braze such parts, it is preferred that the porosity be low and/or that the pores be very small to avoid undue infiltration of the brazing metal or alloy during brazing. One way of avoiding this problem is to use electrolytic iron powder in producing the part, but this powder has an economic disadvantage in that it is expensive. Reduced iron oxide powder and atomized iron powder are cheaper and more attractive from an economic viewpoint.

Thus, the problem resides in providing a proper brazing material for brazing porous ferrous metal parts without losing the brazing material by excessive infiltration, while, at the same time, providing a good strong joint between two powder metal steel parts or between a powder metal steel part and a solid wrought metal substrate, such as steel, cast iron, and the like.

A brazing material has now been discovered for fulfilling these objectives, the brazing material having particular use in the brazing of powder steel parts made from reduced iron oxide powder, atomized iron powder and the like. The brazing material is also advantageous in that it may be used in brazing wrought ferrous metal parts, cast iron, etc. together.

It is thus an object of the invention to provide a brazing alloy composition for use in brazing metal parts together, especially metal parts in which at least one part is a porous powder metallurgy steel part.

Another object is to provide a brazing powder blend comprising a mixture of at least two metallic constituents including as essential ingredients two alloy powders.

A further object is to provide a brazed metal joint of a novel brazing alloy composition in which at least one of the metal substrates at the joint is composed of a powder metallurgy ferrous metal part.

Still another object is to provide a method of brazing a porous powder metallurgy ferrous metal part to another metal part.

These and other objects will more clearly appear when taken in conjunction with the following disclosure, claims and the accompanying drawing wherein:

STATEMENT OF THE INVENTION

Figure 1:
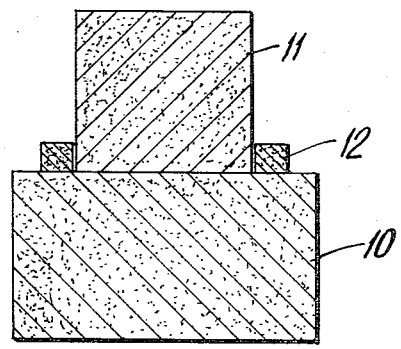
FIG. 1 is a cross section of two powder metallurgy steel parts assembled together for brazing.

The brazing alloy provided by the invention comprises a blended mixture of at least two metallic constituents which include as essential ingredients alloy powders (A) and (B); the ratio of alloy (A) to alloy (B) in parts by weight ranging from about 50(A)/50(B) to about 75(A)/25(B). Composition (A) consists essentially by weight of about 35 to 70 percent copper, about 3 to 20 percent nickel and the balance essentially manganese in the range of about 15 to 50 percent; whereas, alloy (B) consists essentially by weight of about 2.5 to 5.5 percent silicon, 0.75 to 5.25 percent boron and the balance essentially nickel, the mixture of the two alloys being preferably such that the average composition thereof with respect to the silicon and boron contents be about 0.5 to 3 percent silicon and about 0.5 to 1.5 percent boron. It is preferred that the sum of the silicon and boron contents range from about 1.7 to 4 percent.

The blended mixture of the two alloys (A) and (B) is preferably selected so as to provide an overall average composition by weight of about 30 to 50 percent copper, about 10 to 20 percent manganese, about 0.5 to 3 percent silicon, about 0.5 to 1.5 percent boron and the balance essentially nickel in the range of about 30 to 50 percent, the sum of the silicon and boron contents ranging from about 1.7 to 4 percent by weight. A more preferred average composition of the mixture is one consisting essentially by weight of about 35 to 45 percent copper, about 10 to 20 percent manganese, about 1 to 3 percent silicon, about 0.7 to 1.5 percent boron, and the balance essentially nickel in the range of about 36 to 48 percent.

The selected ranges for alloys (A) and (B) for carrying out the preferred aspects of the invention are as follows:

Alloy (A) — about 60 to 70 percent copper, about 6 to 12 percent nickel and manganese essentially the balance in the range of about 15 to 40 percent; and Alloy (B) — about 3.5 to 5.5 percent silicon, about 2 to 4 percent boron and the balance essentially nickel. While the foregoing preferred alloy compositions (A) and (B) are mixed together, it is desirable that the average composition of the mixture be such that the sum of the silicon and boron contents ranges from about 1.7 to 4 percent.

DETAIL ASPECTS OF THE INVENTION

As stated hereinbefore, the invention is particularly applicable to the brazing of a powder metallurgy porous ferrous metal part to another part, whether the other part is a solid metal part or another porous metal part.

An advantage of the novel brazing composition is that it can be employed in combination with the sintering of a green compact, the sintering temperature lying within the desirable brazing temperature range, while avoiding substantial infiltration of the alloy into the part. The sintering and brazing operations are carried out under non-oxidizing conditions, for example, in a reducing atmosphere, such as hydrogen, cracked ammonia, and the like.

The brazing material may be employed as the blend powder at the area to be joined or the blended powder may be pressed into a desired shape conforming to the particular area being brazed or as a paste. Thus, where a cylindrical part is to be brazed to a metal substrate upon which it is placed, an annular ring may be pressed from the blended powder to fit over the cylindrical part and onto the contacting substrate. This is illustrated by FIG. 1 which shows a powder metallurgy pressed steel part 11 around which is a brazing ring 12 of the blended powder falling within the composition range of Alloys (A) and (B).

Figure 2:
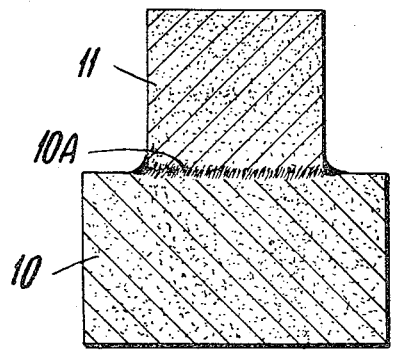
FIG. 2 is a cross section of the same two parts of FIG. 1 after the brazing operation.
Figure 3:
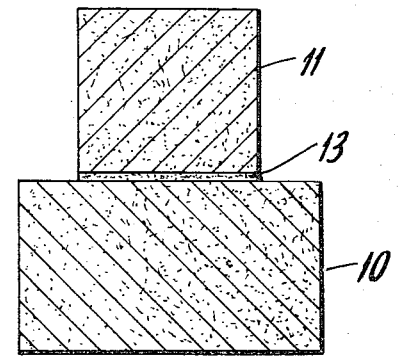
FIG. 3 depicts another assembly for brazing.

As shown in FIG. 1, the parts are ready for sintering as well as brazing. Following sintering and brazing at about 2,050° F in a furnace having an atmosphere of dissociated ammonia, the sintered parts are shown in FIG. 2 in which part 11 has been brazed to part 10 by virtue of the brazed joint 10A which is achieved by the braze melting and flowing along the interface and forming a smooth fillet. The braze material infiltrates the porous substrates only to a limited extent sufficient to provide the necessary diffusion bond while assuring a brazed joint having the required fillet at the interface between the two parts. Where the area at the interface is quite large, a pressed disc 13 or powder or paste of the braze material is placed between the parts to be brazed as shown in FIG. 3.

The fact that the preferred composition of the two alloy powders making up the blend have different melting points might explain the improved behavior of the final average composition. For example, specific compositions of alloys (A) and (B) used in a preferred blend or mixture differ in melting point by about 150° F as follows:

Alloy (A) — 67.5% Cu, 23.5% Mn+9% Ni
Melting point — 1,725°F

Alloy (B) — 92.6% Ni, 4.5% Si+2.9% B
Melting point — 1,875°F

It is believed that the lower melting Alloy (A) inhibits total absorption of the finally melted composition by limiting the initial infiltration to superficial depths. Whatever the theory, the invention enables the achievement of strong joints with good physical properties and appearance.

In determining the combination of materials required for producing an acceptable brazed joint, a plurality of tests was conducted using a compressed powder metal steel part as at least one of the parts to be brazed. The steps employed in producing the steel part comprised mixing about 1 percent by weight of finely divided graphite and three-fourths percent by weight of zinc stearate with minus 100 mesh iron powder (either reduced oxide powder or atomized iron powder) and then pressing the mixture in a die to produce a cylinder of about three-fourths inch in diameter and 1 inch high having a density of about 6.6. The part in this instance is pre-sintered at about 1,000° F to remove the zinc stearate lubricant and the part then superposed on a substrate of pressed steel powder similarly prepared. The superposed parts as shown in FIG. 1 are assembled with the braze material as shown. The braze material has a small but effective amount of a conventional fluoride flux mixed with it, e.g. up to about 5 percent by weight.

In preparing the annular shape of brazing material, the brazing powder is mixed with 1 percent by weight of a binding agent, such as polypropylene glycol (known by the trademark Klucel), and a small but effective amount of a flux as conventionally employed in the art is also added and the mixture pressed into the shape of a ring (note ring 12 of FIG. 1). Various brazing compositions were so prepared and tested.

The parts assembled with the brazing material in place were then subjected to sintering and brazing for about 30 minutes at 2050°F in an atmosphere of dissociated ammonia. Illustrative brazing materials employed in the tests are given in Table 1. The results obtained in the various composition tests are given in Table 2 below.

TABLE 1

| alloy designation | %Cu | %Ni | %Mn | %Si | %B | % other |
|---|---|---|---|---|---|---|
| A | 67.5 | 9.0 | 23.5 | — | — | — |
| B | — | bal. | — | 4.5 | 2.9 | — |
| C | — | bal. | — | 5.0 | 2.9 | 7.0Cr 3.0Fe |
| D | — | bal. | — | 5.0 | 3.5 | 15.0Cr 4.0Fe |
| E | 52.5 | 9.0 | 38.5 | — | — | — |
| Bronze | 90.0 | — | — | — | — | 10 Sn |
| Phos. Cu. | 92.0 | — | — | — | — | 8 P |

TABLE 2

| composition No. | Blend | Results |
|---|---|---|
| 1 | 60% c — 40% Phos. Cu. | Interrupted flow |
| 2 | 59% C—39% Phos. Cu—2% Fe | Interrupted flow |
| 3 | 60% C—10% Phos. Cu—30% A | Interrupted flow |

| | | |
|---|---|---|
| 4 | 60% D—40% bronze | No flow |
| 5 | 55% C—35% bronze —10% Ni | Interrupted flow, brittle bond |
| 6 | 60% C—40% bronze | Strong bond, but no radius and forms crusty residue |
| 7 | 60% B—40% Cu | No flow |
| 8 | 60% C—40% E | Infiltrated |
| 9 | 40% A—60% B | Brittle bond |
| 10 | 80% A—20% B | Infiltration and erosion |
| X | 60% A—40% B | strong bond, good flow and good uniform radius |
| Y | 55% A—45% B | strong bond, good flow and good uniform radius |
| Z | 70% A—30B | strong bond, good flow and good uniform radius |

It will be noted from Table 2 that a large number of the compositions (Compositions 1 to 10) failed to meet the test. Thus, in Composition Nos. 1 to 3, the brazing material exhibited interrupted flow as evidenced by voids in the resulting brazed joint. Composition No. 4 exhibited no flow.

In Composition No. 5, the flow of the braze was interrupted and, moreover, the bond was brittle. In Composition No. 6, while the bond was strong, the fillet had no radius and, in addition, the joint had a crusty residue.

In the case of Composition No. 8, the brazing material was substantially infiltrated to the extent that the joint was substantially impoverished in brazing material.

As regards brazing materials (A) and (B), it will be noted that when formulated to provide the compositions (9) 40 percent (A) — 60% (B), and (10) 80 percent (A) — 20 percent (B), in the former, the bond was brittle at the joint, and in the latter, there was substantial infiltration of the brazing material into the pores of steel accompanied by a marked degree of erosion within the porous steel specimen.

On the other hand, when Alloys (A) and (B) were controlled in a blended mixture over the ranges indicated by Compositions X, Y and Z in Table 2, very strong bonds were obtained, the brazing composition exhibited good flow and the fillet had a good uniform radius as shown in FIG. 2.

As stated hereinbefore, the ratio of the powder blend of Alloys (A) and (B) may range by weight from about 50(A)/50(B) to 75(A)/25(B). Preferably, the ratio of the powder blend may range by weight from about 55(A)/45(B) to 70(A)/30(B).

By employing the advantages of the invention, an improved brazed joint is obtainable comprising one metal part joined to another with the fused brazing alloy interposed therebetween, the fused brazing alloy consisting essentially by weight of about 50 to 30 percent copper, about 10 to 20 percent manganese, about 0.5 to 1.5 percent boron, about 0.5 to 3 percent silicon and the balance essentially nickel, the sum of the boron and silicon contents in the brazed alloy joint ranging from about 1.7 to 4 percent. A preferred composition is one in which the fused brazing alloy consists essentially of about 40 to 35 percent copper, about 12 to 18 percent manganese, about 0.7 to 1.5 percent boron, about 1 to 3 percent silicon and the balance essentially nickel.

Observations have indicated that when Alloy (B) is decreased below the lower limit stated for the blended mixture, infiltration and erosion occurs. On the other hand, when Alloy (B) in the blend is raised above the upper limit of the blended mixture, a brittle braze results at the interface.

A broad range of densities of the powder metallurgy steel parts was tested ranging from about 5.7 to over 6.6 grams/cc. In addition, two wrought steel members were brazed together to provide markedly improved bonding free from a brittle bond.

In the case of the powder metallurgy parts, two types of iron powders were tested: (1) A sponge iron powder referred to as MH–100 and (2) an atomized iron powder referred to as EMP–300.

In the case of the sponge iron powder, the steel was made by blending 1.2 percent by weight of graphite with it. In the case of the atomized powder, 1 percent graphite was blended into it. The densities to which the parts were pressed were 5.7; 6.2 and 6.6. Over these ranges of green densities, good results were obtained at the joint after sintering and brazing without impoverishing the joint in the brazing material.

Where two powder metallurgy parts were brazed together during sintering, tensile strengths of between about 26,000 to 39,000 psi were obtained, the failure being outside the brazed joint. Where solid mild steel was brazed against a solid mild steel, a tensile strength of 47,000 psi was noted with the break occurring outside the brazed joint.

As stated hereinbefore, the brazing temperature may be the same as the sintering temperature for steel-forming powders. While a brazing temperature of about 2,050° F has given good results, the temperature for both sintering and brazing may range from about 1,900° to 2,150° F for about 10 minutes to 1 hour and, more preferably, from about 1,950° to 2,100° F.

As stated above, the brazing alloy is particularly useful on ferrous metals, such as ferrous metals with and without carbon. Examples of ferrous metals containing carbon are steels with carbon ranging from about 0.3 to about 0.8 carbon. The brazing alloy is especially useful on sintered powder metallurgy steel parts.

Although the present invention has been described in conjunction with preferred embodiments, it is to be understood that modifications and variations may be resorted to without departing from the spirit and scope of the invention as those skilled in the art will readily understand. Such modifications and variations are considered to be within purview and scope of the invention and the appended claims.

What is claimed is:

1. A brazing alloy composition comprising a mixture of at least two metallic constituents which include as essential ingredients alloy powders (A) and (B); the ratio of alloy composition (A) to alloy composition (B) ranging in parts by weight from about 50(A)/50(B) to 75(A)/25(B); wherein composition (A) consists essentially by weight of about 35 to 70 percent copper, about 3 to 20 percent nickel and the balance essentially manganese in the range of about 15 to 50 percent; and wherein composition (B) consists essentially of about 2.5 to 5.5 percent silicon, about 0.75 to 5.25 percent boron and the balance essentially nickel; the mixture being selected to provide an average composition in the mixture of about 30 to 50 percent copper, about 10 to 20 percent manganese, about 0.5 to 3 percent silicon, about 0.5 to 1.5 percent boron, and the balance essentially nickel in the range of about 30 to 50 percent.

2. The brazing composition of claim 1, wherein the composition ranges from about 55(A)/45(B) to 70(A)/30(B).

3. The brazing alloy composition of claim 1, wherein the average composition of the total mixture consists essentially by weight of about 35 to 45 percent copper, about 10 to 20 percent manganese, about 1 to 3 percent silicon, about 0.7 to 1.5 percent boron and the balance essentially nickel in the range of about 36 to 48 percent.

4. The brazing composition of claim 1, wherein the average composition of silicon and boron in the total mixture is such that the sum of the silicon and boron contents ranges by weight from about 1.7 to 4 percent.

5. The brazing alloy composition of claim 1, wherein alloy (A) consists essentially by weight of about 60 to 70 percent copper, about 6 to 12 percent nickel and manganese essentially the balance in the range of about 15 to 40 percent; and wherein alloy (B) consists essentially by weight of about 3.5 to 5.5 percent silicon, about 2 to 4 percent boron and the balance essentially nickel.

6. The brazing alloy composition of claim 5, wherein the average composition of silicon and boron contents in the total mixture is such that the sum of the silicon and boron contents ranges by weight from about 1.7 to 4 percent.

7. A brazing alloy composition consisting essentially of about 30 to 50 percent copper, about 10 to 20 percent manganese, about 0.5 to 3 percent silicon, about 0.5 to 1.5 percent boron and the balance essentially nickel, the sum of the silicon and boron contents ranging from about 1.7 to 4 percent by weight.

8. The brazing alloy composition of claim 7 consisting essentially of about 35 to 45 percent copper, about 10 to 20 percent manganese, about 1 to 3 percent silicon, about 0.7 to 1.5 percent boron, and the balance essentially nickel.

9. A brazing alloy composition consisting essentially of about 30 to 50 percent copper, about 10 to 20 percent manganese, at least about 0.5 percent silicon and at least about 0.5 percent boron and the balance essentially nickel, the sum of the silicon and boron contents ranging from about 1.7 to 4 percent by weight.

10. A brazed metal joint comprised of metal parts with a fused brazing alloy interposed therebetween joining said parts together into a strong joint, said fused brazing alloy consisting essentially by weight of about 50 to 30 percent copper, about 10 to 20 percent manganese, about 0.5 to 1.5 percent boron, about 0.5 to 3 percent silicon and the balance essentially nickel, the sum of the boron and silicon contents in the brazed alloy joint ranging from about 1.7 to 4 percent.

11. A brazed metal joint comprised of metal parts, at least one of which is a porous powder metallurgy ferrous metal part, and a fused brazing alloy interposed between said parts joining said parts together into a strong joint with limited penetration of the brazing alloy into the porous ferrous metal part, said fused brazing alloy consisting essentially by weight of about 50 to 30 percent copper, about 10 to 20 percent manganese, about 0.5 to 1.5 percent boron, about 0.5 to 3 percent silicon and the balance essentially nickel, the sum of the boron and silicon contents in the brazed alloy joint ranging from about 1.7 to 4 percent.

12. The brazed joint of claim 11, wherein the brazed joint is formed of two ferrous metal parts.

13. The brazed joint of claim 12 wherein the metal parts are porous powder metallurgy parts of steel.

14. The brazed joint of claim 13, wherein the fused brazing alloy consists essentially by weight of about 40 to 35 percent copper, about 12 to 18 percent manganese, about 0.7 to 1.5 percent boron, about 1 to 3 percent silicon and the balance essentially nickel.

15. A brazed metal joint comprised of metal parts with a fused brazing alloy interposed therebetween joining said parts together into a strong joint, said fused brazing alloy consisting essentially by weight of about 50 to 30 percent copper, about 10 to 20 percent manganese, at least about 0.5 percent boron, and at least about 0.5 percent silicon and the balance essentially nickel, the sum of the boron and silicon contents in the brazed alloy joint ranging from about 1.7 to 4 percent.

16. A method of brazing a porous powder metallurgy ferrous metal part to another metal part which comprises, assembling said porous ferrous metal part in contact with said another metal part at a selected region to be joined, applying to said region a brazing composition formed of a blend of at least two metal ingredients including alloy powders (A) and (B), the to alloy powder ratio by weight of alloy powder (A) (B) ranging from about 50(A)/50(B) to 75(A)/25(B); wherein composition (A) consists essentially of about 35 to 70 percent copper, about 3 to 20 percent nickel and the balance essentially manganese in the range of about 15 to 50 percent; and wherein composition (B) consists essentially of about 2.5 to 5.5 percent silicon, about 0.75 to 5.25 percent boron and the balance essentially nickel, the mixture being such that the average composition thereof is about 30 to 50 percent copper, about 10 to 20 percent manganese, about 0.5 to 3 percent silicon and about 0.5 to 1.5 percent boron; and heating said parts with the applied brazing material under substantially non-oxidizing conditions to a temperature at which the material melts and flows to wet the region being brazed, and then cooling said assembled parts whereby to form a strong brazed joint characterized by limited penetration of the brazing material into the porous ferrous metal part.

17. The method of claim 16, wherein the porous ferrous metal part is made of a compressed steel composition, and wherein the brazing and sintering of said part is carried on simultaneously.

18. The method of claim 17, wherein the brazing and sintering temperature ranges from about 1,900° to 2,150° F.

* * * * *